United States Patent [19]

McFarland

[11] 4,318,371
[45] Mar. 9, 1982

[54] MANIFOLD FOR INTERNAL COMBUSTION ENGINES HAVING INDEPENDENT RUNNERS, A TWO-PLANE LAYOUT, AND INDEPENDENT PLENUMS

[75] Inventor: James D. McFarland, Torrance, Calif.

[73] Assignee: Edelbrock Corp., El Segundo, Calif.

[21] Appl. No.: 955,937

[22] Filed: Oct. 30, 1978

[51] Int. Cl.³ .............................................. F02M 25/06
[52] U.S. Cl. ........................... 123/52 M; 123/52 MV
[58] Field of Search ......... 123/52 M, 52 MB, 52 MC, 123/52 MV, 55 VE, 59 PC

[56] References Cited

U.S. PATENT DOCUMENTS

| | | | |
|---|---|---|---|
| 3,181,517 | 5/1965 | Keinath | 123/52 MV |
| 3,628,512 | 12/1971 | Wu | 123/52 MV |
| 3,717,131 | 2/1973 | Chana et al. | 123/52 MV |
| 4,094,283 | 6/1978 | Sutton | 123/59 PC |
| 4,119,067 | 10/1978 | Aldrich et al. | 123/52 MB |

Primary Examiner—Craig R. Feinberg
Attorney, Agent, or Firm—Christie, Parker & Hale

[57] ABSTRACT

Independent runners of a multiple runner manifold feed from two independent plenums. Alternate runners, in the sense of engine firing order, feed from alternate of the plenums. The physical separation of the plenums attenuates intercylinder interference. Long runners of small cross section provide large mixture quantity and high mixture velocity for good torque. Runner cross-sectional area also is determined by that mixture velocity at which maximum torque occurs. The runners are tuned to the first harmonic to correspond to optimum torque. The runners of one plenum pass over the runners of the other so that runner geometry is simple.

17 Claims, 4 Drawing Figures

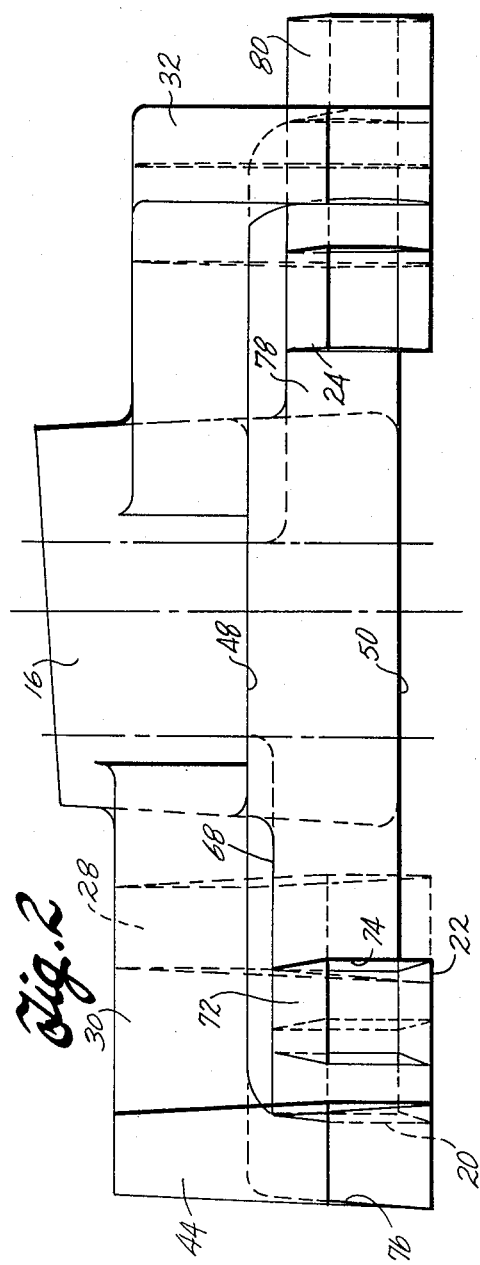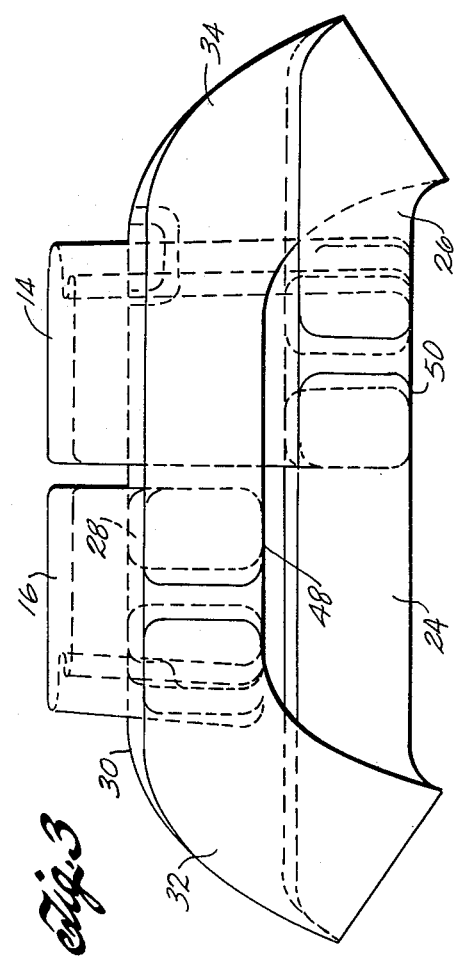

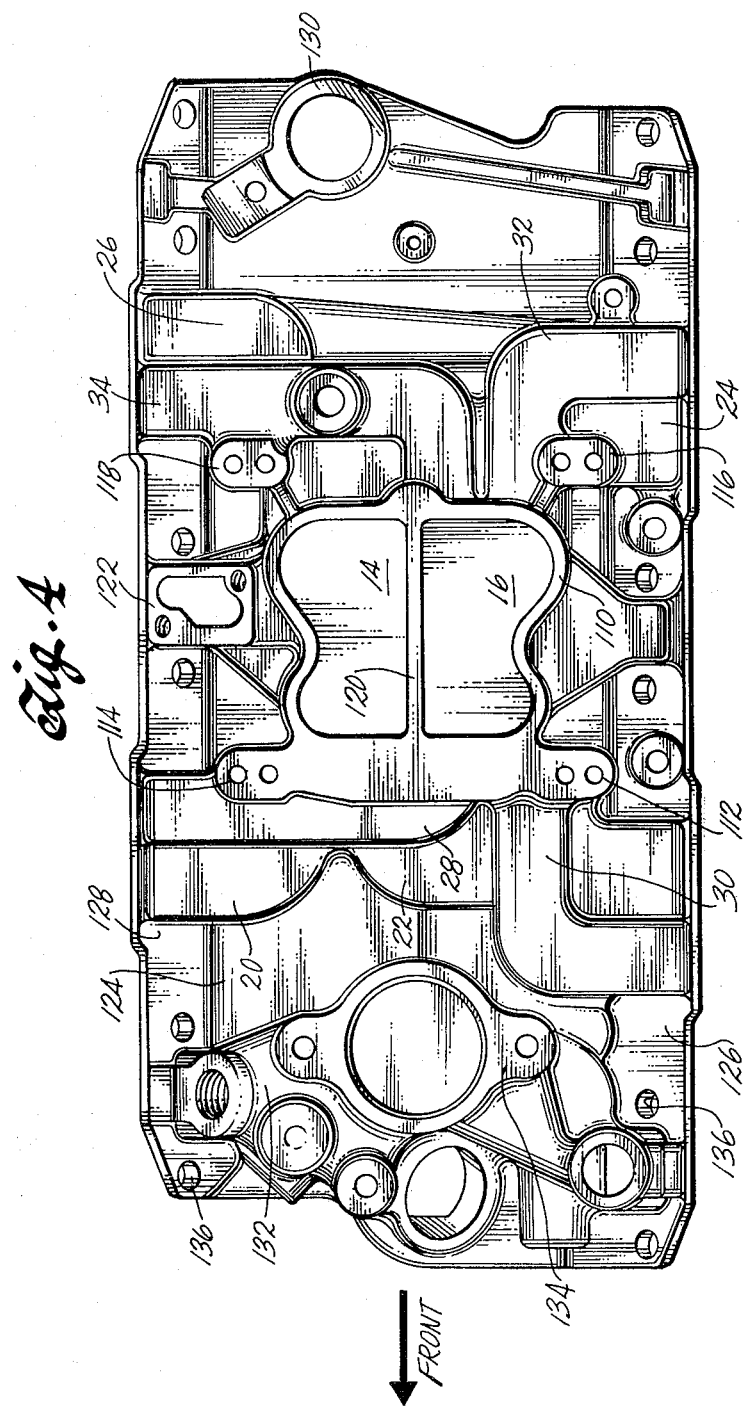

MANIFOLD FOR INTERNAL COMBUSTION ENGINES HAVING INDEPENDENT RUNNERS, A TWO-PLANE LAYOUT, AND INDEPENDENT PLENUMS

BACKGROUND OF THE INVENTION

The present invention relates in general to intake manifolds for internal combustion engines. More in particular, it relates to a unique two-plane, independent runner intake manifold of high volumetric efficiency.

A carbureted internal combustion engine employs an intake manifold to distribute a fuel and an air mixture produced by a carburetor to the cylinders of the engine.

An intake manifold typically has a plenum chamber below the carburetor to receive a mixture of fuel and air from the carburetor. From the plenum the mixture travels to the cylinders through ducts called runners. The runners exit from the manifold at inlet ports to the engine. These ports lead to the cylinders through inlet valves. The inlet valves open and close every other revolution in a four-cycle engine, and do so gradually, that is, the valves do not open and close instantaneously.

A fuel and air mixture is drawn into each cylinder of an engine by a vacuum created there by downward piston movement during the intake stroke of the cylinder. Inlet and exhaust valves into each cylinder provide for the admission of the fuel-air mixture into the cylinder and the exhaustion of products of combustion from the cylinder. The engine itself provides the power to induct the mixture it burns for power. At its lowermost position in a cylinder, a piston is at bottom dead center. The uppermost position of a piston is top dead center.

The dynamics of induction of fuel and air into an engine are very complicated, making generalization difficult. Factors affecting induction include intake and exhaust valve timing, piston speed, inertia of gases undergoing induction, fluid friction, resonance, intercylinder interference, and induction geometry, to name only a few.

The intake valve timing of today's internal combustion engines has the inlet valve opening while the exhaust valve is closing, but before the piston reaches top dead center. Inlet valves close several crank degrees after bottom dead center. This timing accommodates the fact that it takes several crank degrees to effectively open and close the inlet valve. In other words, to have the inlet valve as open as much as possible during the descent of the piston, the inlet valve is given a head start and starts to open before the piston actually begins to descend. To have the inlet valve open and to take advantage of gas inertia, the inlet valve does not close until the piston has begun ascending in the cylinder again. It is quite apparent that the more mixture that is inducted into a cylinder with each cycle, the more efficient the engine will be. If the gases flowing in the runners of an inlet manifold are flowing at a relatively high velocity their inertia can result in an additional amount of mixture charged into the cylinder.

Piston speed directly measures the pumping characteristics of an engine. The higher the piston speed the more mixture is inducted into the engine in a unit of time. Second, piston speed generates pressure pulses that affect movement of the mixture in the intake manifold. As the piston descends, a negative pressure pulse results and this pressure pulse travels upstream of the manifold. As the piston ascends, a positive pressure pulse results and again the pressure travels upstream in the inlet manifold. It is pressure differential that results in mixture movement and the pulses form components of the differential. The pressure pulses travel at the speed of sound. Gas velocity is much slower. The pressure pulses can be used to enhance volumetric efficiency. As a pressure pulse travels up a runner of a manifold and reaches atmosphere, which may be the plenum of the manifold, the gas there overcompensates for the disturbance caused by pulse. Thus when the pressure pulse traveling upstream is positive with respect to the mean inlet manifold pressure it pushes air out of the way in the plenum and creates a locally rarified zone. Rarefaction results from the inertia of the air responding to the positive pulse forcing air out of the zone. The resulting negative pressure travels down the manifold and obviously affects the flow of gas in the manifold. Of more interest is the negative pressure pulse that travels upstream in response to a descending piston. This negative pressure pulse will create rarefaction in the plenum and the gas will rush in to fill the resultant depressed zone generating a positive pressure pulse that travels down the runner towards the cylinder. If the pulse arrives at the cylinder at the right time, say when the inlet valve is about to close, the pulse can add significant quantities of mixture to the cylinder to increase the power of the engine by increasing the volumetric efficiency of the engine. This is known as intake manifold tuning and obviously relies upon the resonance of the mixture which, practically speaking, means resonance of the air.

The speed of the pressure pulse is largely independent of manifold geometry. The velocity of the gas however is not. As the cross-sectional area of the manifold runners decreases, the gas increases in velocity. As the length of the runner increases, the time required for a pulse to travel upstream and back downstream increases. Increased mixture velocity improves the opportunity for cylinder filling at the end portions of the induction cycle. Torque of an engine at relatively low engine speeds is enhanced by increasing the velocity of the mixture in the intake manifold. Fluid friction can become a problem, however, when gas velocity is increased too much.

The pressure history of one cylinder in a multiple cylinder engine can affect the induction performance in other cylinders. Thus pressure pulses traveling up a runner from one cylinder can interfere with the pressure within other runners. Generally it has been the practice to design inlet manifolds with a view towards the elimination of this intercylinder interference.

One of the most popular manifolds produced in this country is the so-called two-plane, over and under, 180° manifold. This manifold has been a standard for some time for most American production V-8 engines using a single 4-barrel or 2-barrel carburetor. The manifold has runners disposed in a complex array. The plenum does not directly communicate with each of the manifold runners. Instead, stubs between the runners and the manifold communicate two or more of the runners with the plenum. The idea behind the two-plane manifold is to isolate cylinders of an engine so that there will be little or no intercylinder interference. The manifold has two plenums, one over the other. Alternate runners, in the sense of the engine's firing order, go to alternate of the plenums. Physical separation into two plenums contains pressure pulses.

In an independent runner manifold, such as described in U.S. Pat. No. 3,744,463 to James McFarland, a common plenum for all of the cylinders of an engine directly communicates with the cylinders of the engine through an independent runner for each cylinder. Thus, for a V-8 engine there are eight independent runners with no stub passages shared by two or more runners. The plenum employs no partitions to separate the plenum into two plenums. Independent runner manifolds in many applications have advantages over the two-plane manifolds. The advantages inhere from simpler induction paths afforded by the manifold and include better cylinder-to-cylinder air-to-fuel ratio uniformity and lower pumping friction work.

A second type of independent runner manifold that does employ compartments in a plenum is described in U.S. Pat. No. 2,771,863 to Ferdinand Porsche. The manifold of the Porsche patent discloses two side-by-side plenums not in communication with one another. The runners leave the plenums at the same elevation. The runners radiate from the plenums with runners to one side of the engine coming from one side of the manifold while runners to the other side of the engine come from the other side of the manifold.

SUMMARY OF THE INVENTION

The present invention provides an improved intake manifold for an internal combustion engine characterized by side-by-side plenums, each serving runners to alternate cylinders, alternate in the sense of the engine's firing order. The runners from each plenum also serve cylinders on both sides of the manifold. Runner length effects resonance at a harmonic frequency corresponding to engine speed at which maximum torque is desired. Runner cross-sectional area is comparatively small to produce high mixture velocity through the runners. One of the plenums is elevationally above the other to afford ease of runner crossover of other runners without using stub passages or excessively tortuous runner configurations.

For a given engine, the cross-sectional area of the runners and engine speed largely determine the velocity of the mixture flowing through the runners. For a given engine, torque is a function of both manifold geometry and engine speed. It has been found that a choice of runner cross-sectional area to produce a mixture velocity that also corresponds to maximum torque produces very good throttle response that is mirrored in acceleration.

In a particular form, the present invention contemplates an intake manifold for an internal combustion engine having an independent runner for each of the engine's cylinders. Means define two plenums that serve these runners. The independent runners are defined by runner means to the plenums. In the sense of the engine's firing order, alternate runners are served by alternate of the plenum chambers. Thus the first plenum chamber serves one runner and the next runner in the sense of the engine's firing order is served by the other plenum chamber, and so on. The plenums are side-by-side as viewed in plan and directly below the base of a carburetor. The runners from each plenum go to both sides of the manifold. In elevation, one plenum is above the other. This elevational difference permits runner crossover of other runners without an excessive number of curves in each runner path. In different words, one of the plenums has a floor below the other and the runners to this lower floored plenum are lower than the runners served by the higher plenum. The length of the runners is long compared to traditional independent runner manifolds. The cross-sectional area of the runners is small. The long runner length effects a substantial quantity of gas in motion when the inlet valve is about to close and therefore a substantial amount of inertia to force a fuel and air mixture into the cylinders served by the runners. The length also produces some ram effect at a harmonic frequency, say the first harmonic. The small cross-sectional area of the runners effects a high mixture velocity. The runners in this manifold leave their plenums in a more or less fore-and-aft orientation and then turn sharply at about a right angle to the inlet ports of the cylinders served by the runners.

The preferred form of the present invention contemplates an improved manifold of the type just described for specific use with a V-8 internal combustion engine. The side-by-side plenums each have four independent and distinct runners between them and the inlet ports of the engines served by the manifold. As before, the runners are made long. They begin at their plenums and extend for a distance generally along the longitudinal axis of the manifold and then turn laterally for registration with the ports. One plenum and set of runners is above the other. The runners of this higher set extend over the runners of the lower set. All the runners terminate at a mounting flange on each side of the manifold angled to register with the heads of the engine for which the manifold is used. As such, the tops and bottoms of the exits of all the runners are cut by two imaginary parallel planes that bridge across the manifold from flange to flange.

These and other features, aspects and advantages of the present invention will become more apparent from the following description, appended claims, and drawings.

BRIEF DESCRIPTION OF THE FIGURES

FIG. 2 illustrates the core layout of the manifold of the present invention in side elevation;

FIG. 3 illustrates the core layout of the present invention in end elevation viewed from the rear of the manifold; and FIG. 4 illustrates in plan the manifold constructed of the cores of the previous Figures.

DESCRIPTION OF THE PREFERRED EMBODIMENT

Figure 1:
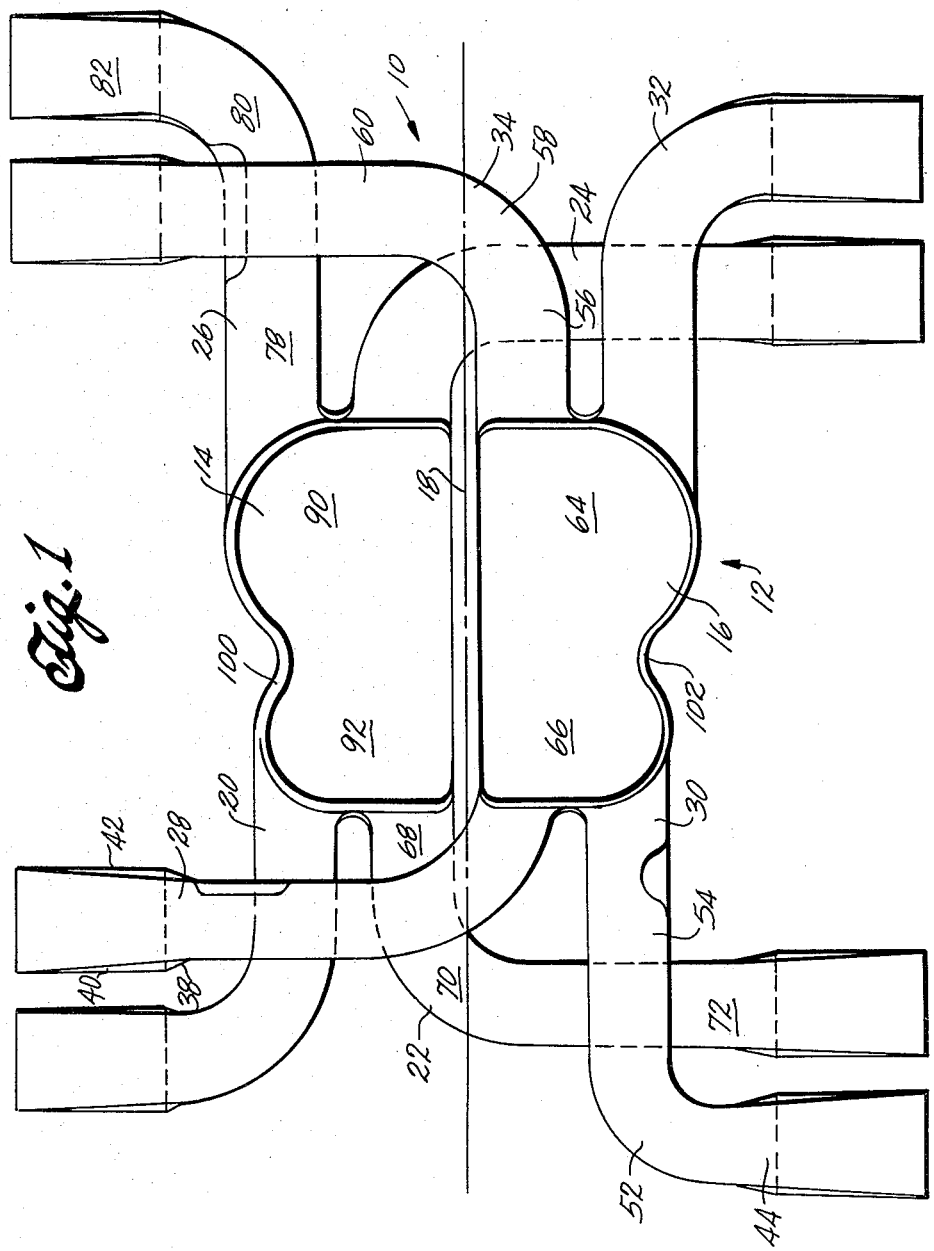
FIG. 1 illustrates the core layout of the preferred embodiment of the manifold of the present invention in plan.

With reference to FIGS. 1 and 4, FIG. 1 shows the core layout for an improved manifold 10 of FIG. 4 constructed in accordance with the present invention. These cores show the passages and void volumes of the manifold and define them with great particularity. The actual manifold will have a skin bounding these cores and is shown in general by FIG. 4. Thus when various parts of the manifold are called out it is to be understood that the envelope of FIG. 4 encloses the passages and spaces. The cores are for molds to produce the manifolds. The cores are arranged in core boxes that define the outside of the manifold. After casting, the cores are destroyed.

A centrally disposed plenum complex 12 of a first plenum 14 and a second plenum 16 resides below a standard 4-barrel carburetor (not shown). One set of a forward and a rear throat of the carburetor enters into one of these plenums while the other set enters into the other plenum. A wall 18 isolates the plenums one from the other. Plenum 14 extends comparatively deeper than plenum 16 and serves a set of four runners 20, 22, 24 and 26. Plenum 16 serves a second set of four runners 28, 30, 32 and 34. Each set of runners is to cylinders firing alternately. Thus the runners of set 20, 22, 24 and 26 serve cylinders that fire alternately with the cylinder served by runners 28, 30, 32 and 34. The firing order, however, does not correspond to the counterclockwise sequence illustrated but instead by the cylinders fed by the following sequence of runners: runners 30, 26, 28, 22, 34, 24, 32 and 20.

Each runner constitutes an independent duct to but one of the inlet ports of the engine using the manifold. Each runner is generally rectangular in cross section, as can be seen in FIG. 3 for runners 30 and 28 where they enter plenum 16. The runners, however, at their exits into the engine all have the same shaped cross sections. The runner exits are all at the same elevational level as the other runners.

With reference again to FIG. 1, in general each of the runners extends longitudinally of the manifold and then abruptly turns with a comparatively sharp radius laterally to the runner's exit. Thus for runner 32 it begins at plenum 16 and extends rearwardly of the engine to a bend that turns the runner 90° for registration with the port of the engine for that runner. The accommodation of the cross section of the ports of the runners is largely effected toward the end of the runners near their exits into the port. Runner 28 has a lower wall 38 and two side walls 40 and 42. As can be seen for this runner, it begins to widen slightly near its exit. Thus its lower wall 38 where it meets side walls 40 and 42 can readily be seen. Its gradual widening can also be seen in the case of runner 30 of FIG. 2. This runner has a lateral section 44 and an exit 46. The runner extends longitudinally from plenum 16 to a lateral section 44 of the runner and then extends laterally to its exit at 46. The runner continuously widens after the turn to the lateral.

With reference to FIG. 2, it can be seen that plenum 16 has a floor 48. Plenum 14 has a floor 50. Floor 48 of plenum 16 in elevation is above floor 50 of plenum 14. Plenum 14 is considerably deeper than plenum 16 but both plenums lie directly below a standard 4-barrel carburetor. Both plenums receive carbureted air and fuel mixture from a small and a large throat of the carburetor.

As previously noted, plenum 16 feeds runners 28, 30, 32 and 34. These runners overlie the four runners fed by lower plenum 14. The runners fed by plenum 16 can be said to be at a level above the runners fed by plenum 14. That level extends more or less horizontally until after the runners have made their turns. Thus for runner 30, it extends at the same level until it reaches its lateral section 44. The transition section for this runner, indicated by reference numeral 52, remains at the same level as the longitudinally extending section of the runner, indicated at 54. The same obtains for the other runners. Thus runner 34 has a longitudinally extending section 56 that merges into a curved transition section 58 that in turn merges into a transition section 60. Sections 56 and 58 are at the same levels as each other and plenum 16. Lateral section 60 extends not only laterally but downwardly for registration with its inlet port. But its downward excursion does not begin immediately. Obviously the length of the runners served by plenum 16 are not quite the same. Nonetheless, the mean length is within a band affected by resonance at a first harmonic. It should be noted, however, that though there is slight difference in runner length the upper plenum is arranged to serve the ports lying on this plenum's side of the centerline of the manifold that are longitudinally furthest away from the plenum. Plenum 16 serves ports on the other side of the centerline of the manifold which are longitudinally close to this plenum. Though the lateral length of the latter runners, runners 28 and 34, exceeds the lateral length of the runners on the same side of the centerline of the manifold as plenum 16, runners 30 and 32, the longitudinal length of the latter two runners is longer.

Plenum 16 in plan has a large compartment 64 and a small compartment 66. Compartments 64 and 66 are in open communication with one another. The compartments are sized to reflect carburetor barrel size.

Plenum 14 serves a lower set of the runners, runners 20, 22, 24 and 26. As in the case of the upper set of runners, these runners extend at the same level as the lower plenum. But differing from the upper runners, these runners do not sweep down elevationally to the extent that the upper runners do. Thus runner 22 extends longitudinally from longitudinal section 68 and merges into a curved transition section 70. This section curves 90° to a lateral section 72. Section 72 slopes downward slightly, as can be seen in FIG. 2. Section 72 exits at 74 longitudinally of an exit 76 of runner 30, but at the same general elevational level. It should be noted again that before the slight elevational change for the runner, the runner has completed its turn. In different words, transition section 70 and longitudinal section 68 are at the same level. Illustrative of an outside runner, runner 26 begins at a longitudinal section 78, which merges into a transition section 80, that turns the runner 90° to a lateral section 82. Again, the longitudinal section and the transitional sections are at the same level and again section 82 slopes downwardly somewhat for registration with the port it empties into. Again to make the runners served by the lower plenum sensibly equal for resonance purposes, the longitudinally most remotely extending runners are placed on the side of the plenum closest to these runners' exits. Thus runners 20 and 26 are placed on the outside of plenum 14 laterally closest to the exits of these runners. Runners 22 and 24 cross over the centerline of the manifold to empty into ports on the opposite side of the manifold from plenum 14, but closer longitudinally than the ports served by runners 20 and 26.

Plenum 14 has a compartment 90 and a second compartment 92. Compartment 90 is directly beneath the large throat of the carburetor while compartment 92 is directly beneath the small throat of the carburetor. Chambers 92 and 90 are free in open communication with one another.

Both plenums 14 and 16 neck in slightly at 100 and 102, respectively, to define their small and large compartments.

The runners from the upper runner set pass over the runners from the lower runner set. Thus runner 30 passes over lateral section 72 of runner 22 and comes down to the same elevational level as the runner after the lateral turn. Runner 28 passes over both runners 22 and 20. After it passes over runners 22 and 20, runner 28 drops down to its exit at about the same elevational level as the exit of runner 20. The same obtains for runner 34. It passes over runners 24 and 26 and then drops down to its exit which is at about the same elevational level as the exit of runner 26. Again, runner 34 does not drop down until after it completely clears runner 26. Runner 32 passes over runner 24.

The cross-sectional area of each of the runners is made about equal to the cross-sectional areas of the other runners so that the velocity through the runners is about the same. Runner cross-sectional area is made as constant as possible. The perimeter of each of the runners is a quadrilateral. As can be seen in FIG. 3, however, with respect to plenum 16 and runners 28 and 30, and runners 34 and 32, there is a slight difference in the cross-sectional area of the runners. Cross-sectional areas of runners 32 and 34 at their entrances are equal to each other but larger than the cross-sectional areas of runners 28 and 30 at the latters' entrances. The entrances of cross-sectional areas of runners 28 and 30 are equal to each other. The same applies for runners served by plenum 14. The cross-sectional areas at the entrance of runners 24 and 26 are equal to each other and the cross-sectional areas of the entrances for runners 20 and 22. It is preferred to maintain runner cross-sectional area constant clear to the heads of the engine using the manifold.

As is standard and readily apparent from FIGS. 2 and 3, the "front" of the plenum complex is lower than the rear of the complex with respect to the level of the runners. This presents a horizontal platform for a carburetor by accommodating the angle of the engine in a vehicle.

With reference to FIG. 4, the entire envelope of the manifold is shown. As seen there, plenums 14 and 16 are bounded by a perimetric wall 110. At the forward end of this wall carburetor mounting bosses 112 and 114 are adapted to support a carburetor. Toward the rear end of the manifold and spaced from the perimetric wall, carburetor mounting bosses 116 and 118 rise from runners 32 and 34 and are adapted to support a carburetor. All of the bosses have drilled and tapped holes for carburetor mounting studs. A vertical wall 120 along the longitudinal centerline of the manifold physically divides plenums 14 and 16. A cooling water cross passage 122 to heat the base of the plenums extends across the manifold under the plenums to serve the known function of warming the plenums to vaporize fuel on their floors. A valley of the manifold has a base defined by a web 124. Mounting flanges 126 and 128 rise upwardly and outwardly from this web for registration with the banks of cylinders of the V-8 engine used with the manifold. Distributor mounting boss 130 at the rear of the manifold is for mounting the distributor. Water gallery 132 at the front of the manifold passes water from cylinder bank to cylinder bank and has an elbow fitting mounting boss 134 for a water hose to the radiator. This boss has drilled and tapped holes for studs for the fitting. Regularly spaced holes 136 through the mounting flanges accept studs rising from the cylinder heads of the engines to attach the manifold to the engine.

The determination of which runners are served by which plenum is determined by the engine's firing order, in addition to considerations of runner length. As previously stated, the engine firing order requires that runners serving cylinders firing sequentially be from alternate plenums. By virtue of the isolation of plenums 14 and 16 no intercylinder interference between sequentially firing cylinders occurs. Runner lengths are longer than in the typical independent runner manifold described in the McFarland patent cited earlier in this specification. Runner length is dictated in some measure by the desire to have resonant frequency at some harmonic at an engine speed corresponding to desired maximum torque. At the fundamental frequency the geometry of the manifold required to effect resonance at desired engine speed is not consistent with high manifold velocities required to effect good throttle response and acceleration. For the latter, the velocity of the mixture through the manifold, for all intents and purposes the velocity of the air in the manifold, should be relatively high and there should be a relatively large quantity of air in motion during that portion of the inlet cycle in which the inlet valve is closing. At fundamental frequencies the runner length was too short for this requirement. At the first harmonic chosen in this particular manifold as used with a Chevrolet V-8, the negative pressure pulse resulting from piston motion travels up the runners of the manifold into the plenums and is reflected back into the manifold runners as a positive pulse because of the overcompensation that results from the air in the plenum rushing into fill the void created by the negative pulse. The positive pulse travels down the runner and into the cylinder where it is reflected as a positive pulse and goes back up the runner. It creates a negative pulse upon its entry into the plenum, which negative pulse goes down the runner and is reflected back again to the plenum to create a positive pulse. This second positive pulse is the pulse relied upon for the charge effect. The runner length is chosen to have this pulse arrive at the inlet valve towards the end of the inlet valve open event so as to augment the inertial effect of the air in motion in that duct in filling the cylinder towards the end of the inlet event.

The inertial effect of the gas in the ducts results in some improvement in volumetric efficiency as a direct result of the fact that the gas is flowing at a relatively high velocity. Though the energy of the gas stream is a function not only of its velocity head but its static pressure head and assuming only modest friction losses, the energy of gas streams flowing in the same engine but at different velocities would be the same. Nonetheless the faster flowing stream will fill a cylinder better than a slower flowing stream because the faster flowing stream has more motional inertial.

The runner geometry of the manifold of this invention effects the above ends. It also reflects ease of casting in that it is obvious from the first three Figures that one runner set and the plenum nests neatly with the other runner set and plenum.

The present invention has been described with reference to a preferred embodiment. The spirit and scope of the appended claims should not, however, necessarily be limited to the foregoing description.

What is claimed is:

1. An improved manifold for a V-type internal combustion engine having two parallel banks of cylinders having inlet ports bounded by two horizontal planes comprising:
 (a) means defining a first plenum disposed for location on one side of the horizontal centerline of the manifold and close to one cylinder bank of the engine;
 (b) means defining a second plenum for the manifold next to the first plenum and on the opposite side of the centerline close to the other bank of the cylinders;
 (c) means for mounting a carburetor directly above the first and second plenums with the horizontal extent of the plenums being below the carburetor;
 (d) first independent runner means from the first plenum having exits bounded by the two horizontal planes, the first runner means having runners to serve longitudinally with respect to the plenum remote cylinders on the same side of the centerline as the first plenum, each of the first runners opening directly into the first plenum, the first runner means having runners crossing over the centerline to serve cylinders that are longitudinally proximate the first plenum;

(e) second independent runner means from the second plenum having exits bounded by the two horizontal planes, the second runner means having runners to serve longitudinally with respect to the plenum remote cylinders on the same side of the centerline as the second plenum, each of the second runners opening directly into the second plenum, the second runner means having runners crossing over the centerline to serve cylinders that are longitudinally proximate the second plenum;

(f) the cross-sectional area of the runners of the first and second runner means being small for high stream velocity and corresponding to the velocity productive of maximum torque;

(g) the length of the runners of the first and second runner means being substantially equal and corresponding to a harmonic frequency of the fundamental frequency of the air at atmospheric temperature that will produce resonance at maximum torque; and (h) the runners of the first runner means entering the first plenum elevationally above the entrance of the second runner means to the second plenum, the first runner means passing over the second runner means, the first runners being correspondingly longer than the second runners in elevation, the second runners being longer than the first runners in the horizontal.

2. The improved manifold claimed in claim 1 wherein the cross-sectional area of each runner from its plenum to proximate its exit is substantially constant.

3. The improved manifold claimed in claim 1 wherein each of the runners has a longitudinal section that extends longitudinally of the manifold, a transition section from the longitudinal section that turns substantially 90°, and a lateral section that extends from the transition section to the exit of the runner.

4. The improved manifold claimed in claim 3 wherein the first runners curve downwardly in the laterally extending sections after the runners have crossed the second runners.

5. The improved manifold claimed in claim 4 wherein the cross section of each runner from its plenum to proximate its exit is substantially constant.

6. The improved manifold claimed in claim 5 wherein the perimeter of each runner is substantially quadrilateral.

7. The improved manifold claimed in claim 5 wherein the first plenum has a floor and the second plenum has a floor, the first plenum floor being above the second plenum floor.

8. An improved manifold for an internal combustion engine comprising:

(a) means for mounting a carburetor;

(b) means defining a first plenum and a second plenum centrally disposed in the manifold with the horizontal perimeter of the plenums being directly below the carburetor;

(c) a plurality of first curved independent runners to the first plenum, each of the first runners having an exit with a top and a bottom cut respectively by two generally horizontal and parallel planes that cut the top and bottom of all other first runners, each of the first runners opening directly into the first plenum and communicating with other of the first runners only through the first plenum;

(d) a plurality of second curved independent runners to the second plenum, each of the second runners having an exit with a top and bottom cut by the corresponding planes that cut the first runners, each of the second runners opening directly into the second plenum and communicating with other of the second runners only through the second plenum;

(e) the first runners entering the first plenum at a level higher with respect to the two planes than the level at which the second runners enter the second plenum, and the first runners passing over the second runners, the length of the first runners being increased relative to the second runners because of the greater vertical rise of the first runners, the length of the second runners in the horizontal being greater than the length of the first runners in the horizontal;

(f) the first runners and the second runners being alternate with respect to each other in the sense of the engine's firing order; and (g) all the runners having substantially the same length corresponding to a harmonic frequency of air in the runners at engine speed maximum torque, the cross-sectional area of each runner being small to produce high mixture velocity through the runners.

9. The improved manifold claimed in claim 8 wherein the cross-sectional area of each runner from its plenum to proximate its exit is substantially constant.

10. The improved manifold claimed in claim 9 wherein each of the runners has a longitudinal section that extends longitudinally of the manifold, a transition section from the longitudinal section that turns substantially 90°, and a lateral section that extends from the transition section to the exit of the runner.

11. The improved manifold claimed in claim 10 wherein the first runners curve downwardly in the laterally extending sections after the runners have crossed the second runners.

12. The improved manifold claimed in claim 11 wherein the first plenum has a floor and the second plenum has a floor, the first plenum floor being above the second plenum floor.

13. The improved manifold claimed in claim 12 wherein the plenums are side-by-side.

14. The improved manifold claimed in claim 8 wherein the first and second runners extend from the plenums generally horizontally and then curve downwardly to their exits.

15. The improved manifold claimed in claim 14 wherein the perimeter of each runner is substantially quadrilateral.

16. The improved manifold claimed in claim 14 wherein the first and second runners have sections that extend longitudinally of the manifold and sections that extend laterally of the manifold to the runner exits.

17. The improved manifold claimed in claim 16 wherein the first runners curve downwardly in the lateral extending sections.

* * * * *